(12) United States Patent
Inaba (10) Patent No.: US 7,652,616 B2
(45) Date of Patent: Jan. 26, 2010

(54) TARGET OBJECT DETECTION SYSTEM

(75) Inventor: Takayuki Inaba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 58 days.

(21) Appl. No.: 11/791,732

(22) PCT Filed: Feb. 8, 2005

(86) PCT No.: PCT/JP2005/001810

§ 371 (c)(1),
(2), (4) Date: May 25, 2007

(87) PCT Pub. No.: WO2006/085352

PCT Pub. Date: Aug. 17, 2006

(65) Prior Publication Data

US 2008/0042895 A1 Feb. 21, 2008

(51) Int. Cl.
G01S 13/00 (2006.01)
G01S 13/08 (2006.01)
G01S 13/58 (2006.01)

(52) U.S. Cl. .................. 342/70; 342/104; 342/112; 342/129

(58) Field of Classification Search ............. 342/70–72, 342/104, 109, 112, 127–129, 133
See application file for complete search history.

(56) References Cited

U.S. PATENT DOCUMENTS

| | | | | |
|---|---|---|---|---|
| 3,750,171 | A | * | 7/1973 | Faris .................. 342/112 |
| RE33,152 | E | * | 1/1990 | Atlas ................... 342/26 R |
| 4,960,329 | A | * | 10/1990 | Schofield ............... 356/5.09 |
| 5,349,358 | A | * | 9/1994 | Canal .................. 342/128 |
| 5,646,623 | A | * | 7/1997 | Walters et al. .......... 342/129 |

(Continued)

FOREIGN PATENT DOCUMENTS

EP  1 253 441 A1  10/2002

(Continued)

OTHER PUBLICATIONS

High range resolution performance of frequency stepped radar signal Long Teng; Mao Erke; Han Yueqiu; Radar, 1996. Proceedings., CIE International Conference of Oct. 8-10, 1996 pp. 242-245.*

(Continued)

*Primary Examiner*—Thomas H Tarcza
*Assistant Examiner*—Peter M Bythrow
(74) *Attorney, Agent, or Firm*—Birch, Stewart, Kolasch & Birch, LLP (57) ABSTRACT

A time needed until measurement values are obtained in a two-frequency continuous wave radar systems is reduced.

An object detection system that emits transmission signals, as transmission waves, whose frequencies have been modulated successively into a plurality of stepped frequencies, and receives echoes of the transmission waves reflected from target objects, thereby calculating relative velocities of the target objects by frequency-analyzing reception signals obtained from the received echoes. The target object detection system includes: a frequency modulation component that repeatedly executes frequency-modulation processes to successively modulate the transmission signals into those of the stepped frequencies, within a minimum measurement time in which a desired velocity resolution is achieved; and a frequency-analysis component that frequency-analyzes throughout the repeated frequency-modulation processes the reception signals processed by the frequency-modulation component.

12 Claims, 3 Drawing Sheets

U.S. PATENT DOCUMENTS

| | | | | |
|---|---|---|---|---|
| 5,835,199 | A | * | 11/1998 | Phillips et al. ............. 356/5.03 |
| 5,923,284 | A | * | 7/1999 | Artis et al. .................. 342/129 |
| 5,963,163 | A | * | 10/1999 | Kemkemian et al. ........ 342/109 |
| 6,028,548 | A | * | 2/2000 | Farmer ........................ 342/70 |
| 6,043,773 | A | * | 3/2000 | Watanabe .................... 342/71 |
| 6,611,225 | B2 | * | 8/2003 | Mitsumoto et al. ........... 342/70 |
| 6,703,967 | B1 | * | 3/2004 | Kuroda et al. ............... 342/111 |
| 6,747,592 | B2 | * | 6/2004 | Nakamura ................... 342/70 |
| 6,864,832 | B2 | * | 3/2005 | Mende et al. ................ 342/70 |
| 6,956,521 | B2 | * | 10/2005 | Kai ............................. 342/70 |
| 6,980,151 | B1 | * | 12/2005 | Mohan ........................ 342/13 |
| 7,023,376 | B1 | * | 4/2006 | Kuroda et al. ................ 342/70 |
| 7,436,348 | B2 | * | 10/2008 | Nohmi ..................... 342/25 R |
| 7,466,260 | B2 | * | 12/2008 | Ishii et al. ................... 342/70 |
| 2003/0179128 | A1 | | 9/2003 | Mende et al. |
| 2004/0196177 | A1 | * | 10/2004 | Billington et al. ........... 342/174 |

FOREIGN PATENT DOCUMENTS

| | | | |
|---|---|---|---|
| JP | 5-114873 | A | 5/1993 |
| JP | 5-297121 | A | 11/1993 |
| JP | 2001-116831 | A | 4/2001 |
| JP | 2002-71793 | A | 3/2002 |
| JP | 2002-311155 | A | 10/2002 |
| JP | 2003-222668 | A | 8/2003 |
| JP | 2004-517783 | A | 6/2004 |
| WO | WO 01/55745 | A1 | 8/2001 |

OTHER PUBLICATIONS

Kajiwara et al., "Clutter Suppression Characteristics of Stepped-FM Radar with Music Algorithm," The University of Kitakyushu, vol. J84-B, No. 10, 2001, pp. 1848-1856. (abstract enclosed).

Shintarou et al., "Music Algorithm Implementation for Millimeter-Wave FM-CW Radar," Proceedings of the IEICE General Conference, vol. 1997, Communication No. 1, p. 228. (abstract enclosed).

Skolnik, "Introduction to Radar Systems," International Student Edition, McGraw-Hill Inc., 1992, preface and pp. 106-111.

Takano et al., "Environment Recognition Technologies for Supporting Safe Driving," Hitach Review, vol. 86, No. 5, pp. 43-46 and 10-11. (English-language translation enclosed).

Fujita et al., The 47th IEEE International Midwest Symposium on Circuits and Systems, 2004, pp. II-85-II-88.

Bouchard et al., High resolution spectrum estimation of FMCW radar signals, pp. 421-424.

\* cited by examiner

TARGET OBJECT DETECTION SYSTEM

TECHNICAL FIELD

The present invention relates to radar systems that detect speeds and the like of target objects by emitting radio waves thereto.

BACKGROUND ART

Recently, there have been active studies that attempt to enhance driving safety by mounting on a vehicle such as an automobile a radar system that automatically detects surrounding obstacles and the like to make use of the detection results for vehicle cruise control. The radar system used in the vehicle cruise control needs to detect relative speed information on obstacles and other vehicles with high accuracy.

While such radar system detects speeds, positions, and the like of target objects by frequency-analyzing reception signals obtained by receiving incoming radio waves from the target objects, in order to improve frequency resolution in the frequency analysis of the reception signals, it is necessary to receive the signals for more than a predetermined time period. Taking more time for measurement of the reception signals, the frequency resolution is improved accordingly, which increases accuracy of measurement values outputted as the result.

A minimum measurement time required for achieving a desired velocity resolution can be determined in principle depending on a frequency analysis method to be employed. For example, in a radar system using transmission waves of wavelength $\lambda$, if reception signals are frequency-analyzed by a Fourier transformation, a minimum measurement time $T_c$ required for obtaining a velocity resolution $\delta V$ and a frequency resolution $\delta f$ is known to satisfy Formula (1):

$$\delta V = \frac{\lambda}{2}\delta f = \frac{\lambda}{2} \cdot \frac{1}{Tc}. \quad (1)$$

Cost reduction is a key for vehicle-mounted radars to come into widespread use. In order to achieve cost reduction of radar systems, a frequency-modulated continuous wave (FMCW) method or a two-frequency continuous wave (CW) method is likely to be advantageous that is feasible with low speed signal processing compared with a pulse radar or a pulse compression radar (spread spectrum radar) that requires a signal processing circuit of high performance.

The FMCW method is a method in which beat signals are created from transmitted signals and received signals obtained by receiving reflection waves from target objects during two measurement periods of an up-chirp and a down-chirp in frequency, to detect relative speeds of and distances to the target objects by combining beat signals obtained during the up-chirp period with those obtained during the down-chirp period. In this case, since the respective beat signals needs to be determined independently from the up-chirp and the down-chirp periods, both up-chirp and down-chirp periods have to be equal to or more than the time $T_c$. Accordingly, it takes at least twice the time $T_c$ to obtain measurement values satisfying a desired velocity resolution.

On the other hand, the two-frequency CW method is a method in which transmission waves of two frequencies $f_1$ and $f_2$ each are emitted for a fixed time period, to detect target objects from frequency and phase information of respective received waves. In this case also, since frequency-analysis process of the received waves for the transmission waves of frequency $f_1$ and those for the transmission waves of frequency $f_2$ are independent of each other, it is needed that after the transmission waves of frequency $f_1$ have been emitted at least for the time $T_c$ and their reflection waves have been received, the transmission waves of frequency $f_2$ are emitted at least for the time $T_c$ and their reflection waves are received. For that reason, in order to obtain measurement values satisfying a desired velocity resolution even in the two-frequency CW method, it resultantly takes at least twice the time $T_c$.

Thus, either the conventional FMCW or two-frequency CW method needs a measurement time that is twice or more the time $T_c$ in order to obtain measurement values with a desired velocity resolution. As a method of obtaining measurement values within twice the time $T_c$, a method is known in which relative speeds of and distances to target objects are detected by combining phase differences of reception wave beat signals obtained from transmission waves of different frequencies during either an up-chirp or a down-chirp period in an FMCW method (refer to Patent Document 1, for example).

Patent Document 1: "Method and Device for Determining Separation and Relative speed of a Distant Object"; Japanese Unexamined Patent Publication No. 2004-511783.

Patent Document 2: "Radar System"; Japanese Unexamined Patent Publication No. 2002-71793.

DISCLOSURE OF INVENTION

The method disclosed in Patent Document 1 is based on an FMCW method. In order to realize by the FMCW method a distance resolution generally required for vehicle-mounted radars, its frequency needs to be modulated actually over as wide a bandwidth as 150 MHz. In order for a plurality of vehicles mounted with FMCW radars to coexist on a road without interference with each other, it would be ideal that a unique frequency range is assigned to the radar system of each vehicle to modulate the frequencies within the range. Since a possible frequency bandwidth to be assigned to vehicle-mounted radars, however, is presumed to be on the order of one GHz, at most six FMCW radars that sweep over as wide the frequency range as 150 MHz can exist simultaneously, which will be far from practical.

The present invention has been made to solve such problems. Namely, the objective is to provide, employing a two-frequency CW method or a multi-frequency CW method, a radar system that detects target objects with a desired velocity resolution being achieved within half a measurement time of a conventional radar system.

A target object detection system of the present invention that emits toward a target object transmission signals, as transmission waves, whose frequencies have been modulated successively into a plurality of stepped frequencies, and receives echoes of the transmission waves reflected from the target object, for calculating a relative velocity of the target object by frequency-analyzing reception signals obtained from the received echoes. The target object detection system includes: a frequency-modulation means for executing a plurality of times frequency-modulation processes to successively modulate the transmission signals into those of the stepped frequencies, within a minimum measurement time in which a desired velocity resolution is achieved; and a frequency-analysis means for frequency-analyzing throughout the plurality of frequency-modulation processes those signals, among the reception signals, corresponding to an identical stepped frequency, in the frequency-modulation processes.

Here, a minimum measurement time in which a desired velocity resolution is achieved denotes a measurement time that is determined in principle to be minimum based upon a frequency-analysis method employed in the radar system; in a case of a Fourier transformation, the minimum time is given as the time $T_c$ satisfying Formula (1), which has been already described. When a frequency analysis other than Fourier transformations is performed, in a case of a desired velocity resolution being achieved, for example, by using a super-resolution method, a lower limit of its measurement time can also be determined in a similar manner. In that case, the lower limit of the measurement time in the super-resolution method comes to be equivalent to the minimum measurement time.

Moreover, those signals, among the reception signals, corresponding to an identical stepped frequency in the frequency-modulation processes signify signals obtained by receiving the echoes of the transmission signals having been modulated into signals of an identical stepped frequency in the plurality of frequency-modulation processes iterated by the frequency-modulation means.

According to a target object detection system of the present invention, while making use of a conventional two-frequency CW or multi-frequency CW method with its features being kept intact, measurement values can be obtained that satisfy a desired velocity resolution in a measurement time shorter than that by the conventional two-frequency CW or multi-frequency CW method. The features of the conventional two-frequency CW or multi-frequency CW method described here mean such advantages as narrower its necessary frequency-modulation bandwidth to be assigned to the radar system or can simplify its transmission frequency-modulation circuit.

REFERENCE NUMERALS

2: transmission-signal frequency-modulation unit,
3: circulator,
4: transmit/receive antenna,
5: reception RF frequency-converter,
6: frequency-analysis unit,
7: distance/velocity calculator,
11: reference-signal generator,
12: transmission RF frequency-converter,
13: pulse modulator,
14: A/D converter,
15: reception-signal storage means,
16: frequency analyzer,
71: velocity calculator, and
72: distance calculator.

BEST MODE FOR CARRYING OUT THE INVENTION

Aspects of the present invention will be explained below with reference to the drawings.

EMBODIMENT 1

Figure 1:
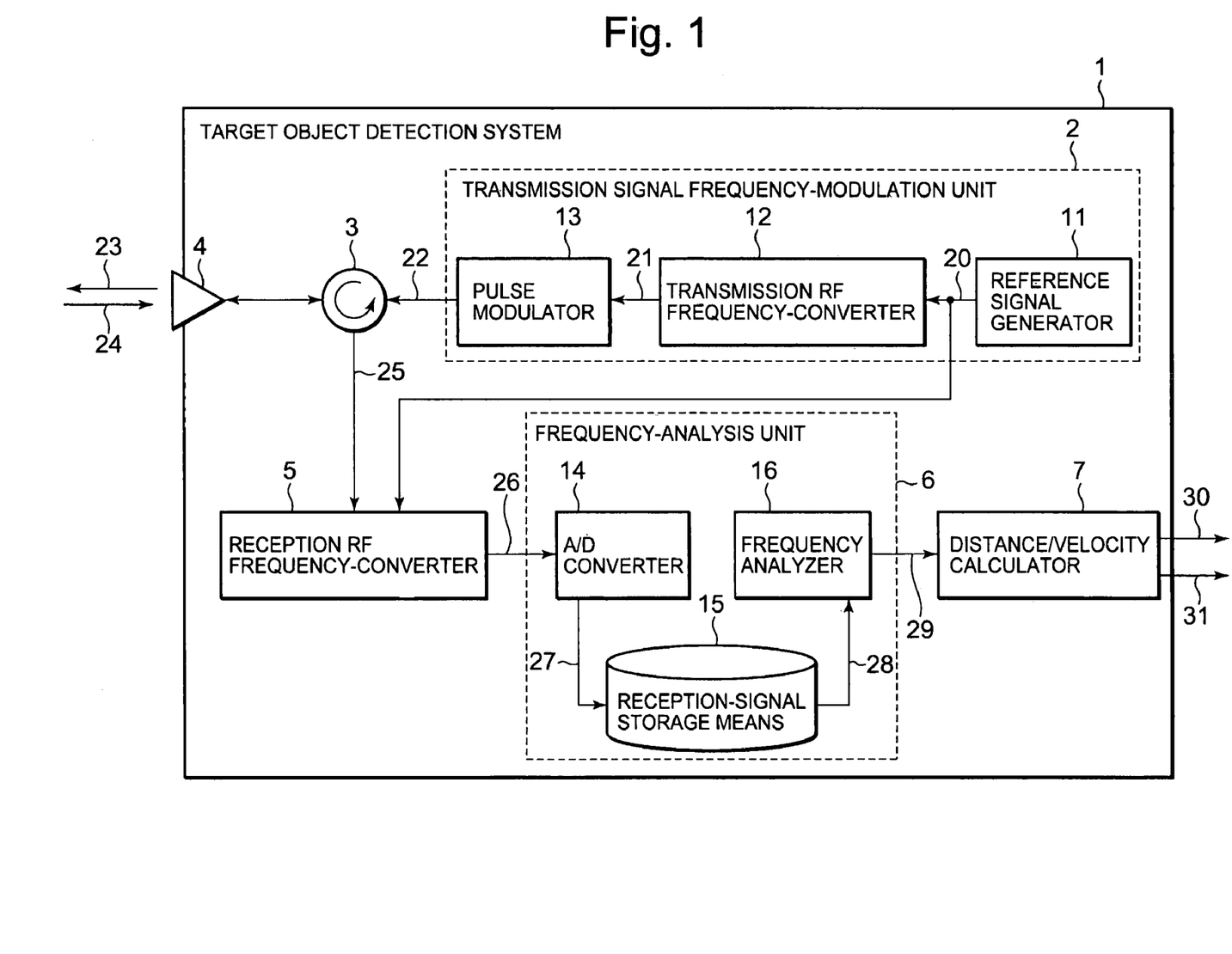
FIG. 1 is a block diagram illustrating a configuration of a target object detection system according to Embodiment 1 of the present invention.

FIG. 1 is a block diagram illustrating a configuration of a target object detection system according to Embodiment 1 of the present invention. Referring to the figure, the target object detection system 1 is provided with a transmission-signal frequency-modulation unit 2, a circulator 3, a transmit/receive antenna 4, a reception RF frequency-converter 5, a frequency-analysis unit 6, and a distance/velocity calculator 7.

The transmission-signal frequency-modulation unit 2 has a circuit that generates transmission signals and modulates the frequencies of the generated transmission signals into those according to a predetermined waveform. An example of a detailed configuration of the transmission-signal frequency-modulation unit 2 is further shown in FIG. 1. The transmission-signal frequency-modulation unit 2 according to the configuration example is composed of a reference signal generator 11, a transmission RF frequency-converter 12, and a pulse modulator 13.

The reference signal generator 11 includes a voltage-controlled oscillator (VCO) to generate reference signals 20 as transmission signals whose frequency is periodically modulated by controlling input voltage to the voltage-controlled oscillator. The transmission RF frequency-converter 12 is a circuit that frequency-converts the reference signals 20 into transmission signals 21 in a radio frequency (RF) band. The pulse modulator 13 generates transmission pulse signals 22 by modulating the transmission signals 21 into pulses at predetermined pulse-repetition time intervals.

The circulator 3 is a switch that time-divisionally switches connections between the transmission-signal frequency-modulation unit 2 and the antenna 4, and between the antenna 4 and the reception RF frequency-converter 5 that is described later. That is, at the time the transmission pulse signals 22 are emitted to target objects as transmission waves, the transmission-signal frequency-modulation unit 2 and the antenna 4 are directly connected with each other on the one hand; at the time the transmission waves return to the antenna 4 as echoes reflected from the target objects, the reception RF frequency-converter 5 and the antenna 4 are directly connected with each other on the other hand. That allows the antenna 4 to serve as both an emitter and a receiver, and allows not only the circuit but also the device of the target object detection system 1 to be downsized.

The antenna 4 emits to target objects the transmission pulse signals 22 as transmission waves 23 generated by the transmission-signal frequency-modulation unit 2, and at the same time, receives echoes 24, as reception waves, of the transmission waves 23 reflected from the target objects, to output the echoes as received analog signals 25.

The reception RF frequency-converter 5 is a section that frequency-converts the reception analog signals 25 in an RF band into signals in a video signal band in order to allow the reception signals to be processed by a lower-speed signal processing circuit, and that execute a baseband-conversion as well. The reception signals having been baseband-converted are outputted as reception signals 26.

The frequency-analysis unit 6 is a section that frequency-analyzes the reception signals 26 having been baseband-converted. In FIG. 1, an A/D converter 14, a reception-signal storage means 15, and a frequency analyzer 16 are shown as a detailed configuration example of the frequency-analysis unit 6. The A/D converter 14 converts the reception signals 26, which are analog signals, into digital signals at a predetermined sampling rate, to output reception digital signals 27. The reception digital signals 27 are stored in the reception-signal storage means 15.

The reception-signal storage means 15 is a circuit, which is composed using, for example, memory chips, to store the reception digital signals 27 outputted by the A/D converter 14. The frequency analyzer 16 extracts reception signals 28 from the reception-signal storage means 15 so as to frequency-analyze the reception signals. Frequency-analyzed results 29 of the frequency analyzer 16 are outputted to the distance/velocity calculator 7 as outputs from the frequency-analysis unit 6.

The distance/velocity calculator 7 is a circuit that detects, from the signals of the frequency-analyzed results 29, frequency components that give peak amplitude values, to calculate relative velocities 30 of and distances 31 to each target object based on the detected frequencies.

Next, an operation of the target object detection system 1 will be explained. At the beginning, a velocity resolution required for the target object detection system 1 is designated as $\delta V$, and a minimum measurement time, as $T_c$ that is necessary to achieve the velocity resolution $\delta V$ on the principle of frequency-analysis process.

Figure 2:
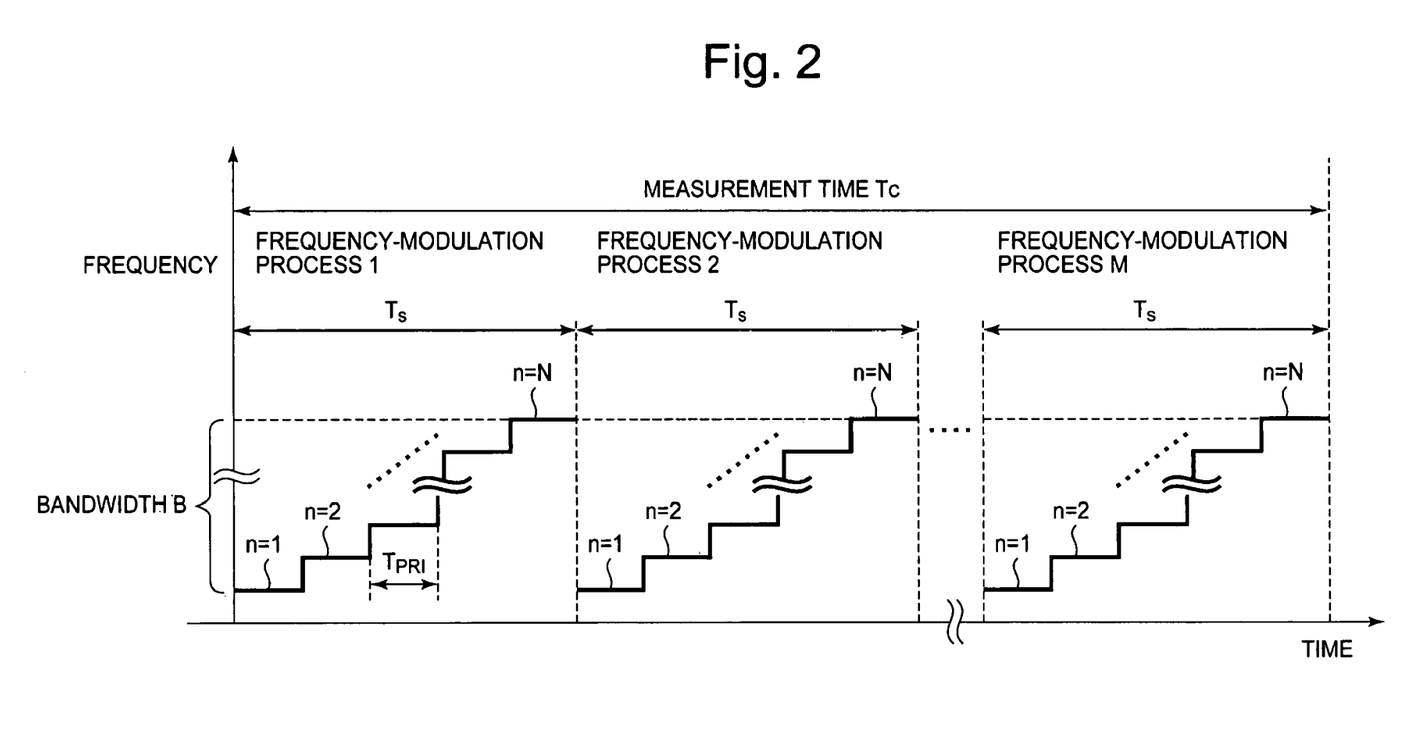
FIG. 2 is a transmission signal waveform diagram in the target object detection system according to Embodiment 1 of the invention.

The reference signal generator 11 in the transmission-signal-frequency-modulation unit 2 iterates M times frequency-modulation processes in which frequencies of the reference signals 20 are increased step-wise by $\Delta f$ within the minimum measurement time $T_C$. Here, M is a natural number of two or more. FIG. 2 illustrates a diagram of the waveforms of the reference signals 20 thus generated. The frequency-modulation processes iterated by the reference signal generator 11 are those in which the frequencies of the reference signals 20 are increased by $\Delta f$ every $T_{PRI}$ time throughout N steps (where N is a natural number of two or more). A time span $T_S$ of one of the frequency-modulation processes is given as $T_S = T_{PRI} * N$. A modulation frequency range B is also given as $B = \Delta f * N$.

The reference signals 20 thus generated are converted into the transmission signals 21 in an RF band through the transmission RF frequency-converter 12, and further converted into the transmission pulse signals 22 through the pulse modulator 13, to be emitted as the transmission waves 23 from the antenna 4 to target objects. Part of the transmission waves 23 emitted to the target objects return again as the echoes (reflected waves) 24.

The antenna 4 receives the echoes 24 and outputs the reception analog signals 25. The reception RF frequency-converter 5 baseband-converts the reception analog signals 25 to output the reception signals 26 having been baseband-converted. Designating the number of target objects as I and the reception signals 26 as X(n, m) that have been baseband-converted at a step n in a frequency-modulation process m, then X(n, m) is expressed by Formula (2):

$$X(n, m) = \sum_{i=1}^{I} \sigma_i \exp\left[j\left\{2\pi\left(\left(\frac{2}{\lambda}v_i T_s\right)m + \left(\frac{2}{\lambda}v_i T_{PRI} - \frac{2R_i}{c}\Delta f\right)n\right) + \phi_i\right\}\right], \quad (2)$$

where $\sigma_i$, $V_i$, and $R_i$ are a radar-reflection cross-section of, a relative velocity of, and a distance to each target object, respectively, and $\phi_i$, a constant phase term of an individual target object.

The reception signals 26 are converted by the A/D converter 14 into the reception digital signals 27 to be stored in the reception-signal storage means 15. The frequency analyzer 16 extracts from the reception-signal storage means 15 reception signals obtained from the echoes of the transmission signals whose frequency have been modulated into an identical stepped frequency, and frequency-analyzes the reception signals throughout the plurality of frequency-modulation processes. This process is equivalent to frequency analysis of those X(n, m), out of reception signals X(n, m) stored in the reception-signal storage means 15, obtained for a single n-value and a plurality of m-values. Using a Fourier transformation as a frequency-analysis method, the frequency-analyzed results 29 are expressed by Formula (3):

$$F_k(n) = \sum_{m=0}^{M-1} X(n, m) \exp\left[-j\left\{2\pi\left(\left(\frac{k}{M}\right)m\right)\right\}\right] \quad (3)$$

In the following explanation, k in Formula (3) is referred to as a frequency component number.

The distance/velocity calculator 7 calculates relative velocities of and distances to target objects from the frequency-analyzed results 29 obtained from Formula (3). For that purpose, the following processes are executed. First, the distance/velocity calculator 7 calculates an amplitude-value summation of $F_k(n)$ expressed by Formula (3) using, for example, formula (4):

$$G_k = \sum_{n=1}^{N} |F_k(n)| \quad (4)$$

Next, the distance/velocity calculator 7 determines a frequency component number k at which a $G_k$-value of Formula (4) peaks. This process is performed by detecting a frequency component number $k_{peak}$ that makes a $G_k$-value, the left hand side of Formula (4), local maximum. On the other hand, a peak frequency $f_{peak}$ of the reception signals having been baseband-converted, which is expressed by Formula (2), is given by Formula (5):

$$f_{peak}(n) = \frac{k_{peak}}{M} T_s = \frac{2v_i}{\lambda} \quad (5)$$

Thus, the distance/velocity calculator 7 calculates relative velocities $V_i$ from peak frequency numbers at which Formula (4) becomes local maximums and from Formula (5), to output $V_i$ as the relative velocities 30.

Furthermore, the distance/velocity calculator 7 calculates distances R to the target objects at the relative velocities $V_i$. For that purpose, the following processes are executed. First, the distance/velocity calculator 7 extracts frequency components for at least two n-values out of peak frequency components corresponding to $V_i$, among frequency components expressed by Formula (3). Here, as an example, a frequency component at $f_{peak}(n)$ for an n-value and that at $f_{peak}(n+1)$ for adjacent n-value are assumed to be extracted.

Expressing phase components of these frequency components as Phase($f_{peak}(n)$) and Phase($f_{peak}(n+1)$), the distances R to the target objects are calculated based on the principle of the two-frequency CW method by Formula (6):

$$R = \frac{c}{4\pi\Delta f} \sum_{n=1}^{N-1} (\text{Phase}(f_{peak}(n+1)) - \text{Phase}(f_{peak}(n))). \quad (6)$$

The distances R to the target objects thus calculated are outputted as the distances 31.

As is apparent from the above, a target object detection system of Embodiment 1 emits to target objects transmission waves that have been modulated by iterating the frequency-modulation processes a plurality of times in the minimum measurement time $T_c$ required for achieving a desired velocity resolution $\delta V$, and frequency-analyzes, throughout the frequency-modulation processes different from one another, those signals corresponding to an identical stepped frequency among reception signals obtained from the echoes of the transmission waves; thereby, relative velocities of and distances to the target objects can be calculated from measurement only in the minimum measurement time $T_c$.

In the above explanations, a frequency-analysis method has been explained taking a Fourier transformation as an example; however, it is easy for those skilled in the art to conduct the frequency analysis using a super-resolution method instead.

Moreover, in the frequency-modulation processes, the transmission-signal frequency-modulation unit 2 is configured to monotonically increase the reference-signal frequencies step-wise by $\Delta f$. However, since a configuration required here is only to modulate reference signals into a plurality of frequencies, frequency modulation may be executed in a configuration using other methods such as of monotonically decreasing frequency or of modulating it into random frequencies.

EMBODIMENT 2

When there exists a plurality of target objects traveling at the same relative speed, a radar system using a conventional two-frequency CW method has a problem in that distances to each target object cannot be correctly discriminated. On the roads where vehicle-mounted radars are mostly used, a situation occurs with great frequency in which a plurality of vehicles travels at nearly the same speed in the same direction. A problem with radar system employing the conventional two-frequency CW method, however, has been that distances to each target object cannot be correctly discriminated in such situation, which has been a hindrance to its practical use.

In order to solve such problem, a method has been known that discriminates distances to a plurality of target objects traveling at the same speed, by introducing linear modulation into part of frequency modulation periods of transmission waves in a two-frequency CW radar so as to execute processes similar to an FMCW method (for example, refer to Patent Document 2).

The method, however, requires a more complicated modulation circuit for the transmission waves. For that reason, cost reduction, which is one of main purposes of employing a two-frequency CW method, cannot be sufficiently achieved. Hence, in Embodiment 2 of the present invention, a radar system will be explained that can discriminate distances to a plurality of target objects traveling at the same speed by use of transmission waves that are modulated only into those of stepped frequencies through a simple transmission-signal modulation circuit identical to that in Embodiment 1.

Figure 3:
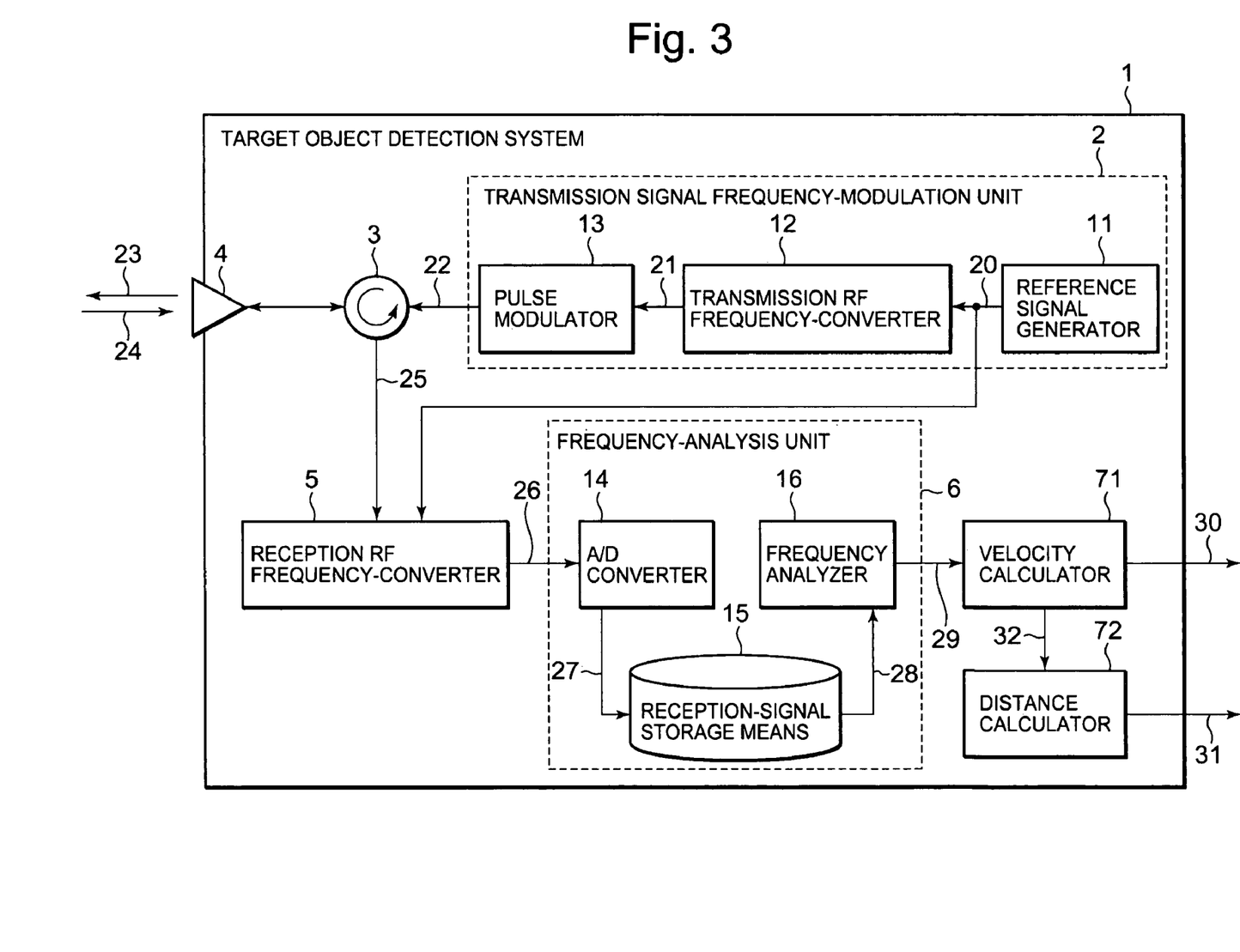
FIG. 3 is a block diagram illustrating a configuration of a target object detection system according to Embodiment 2 of the present invention.

FIG. 3 is a block diagram illustrating a configuration of a radar system according to Embodiment 2 of the invention. Referring to FIG. 3, the radar system is distinguished from that of Embodiment 1 in that a velocity calculator 71 and a distance calculator 72 are provided. The velocity calculator 71 is a section that executes a velocity-calculation process similar to that by the distance/velocity calculator 7 in Embodiment 1, to output the relative velocities 30 together with frequency analysis information 32 used in the calculation of the velocities 30. On the other hand, the distance calculator 72 is a section that executes a frequency analysis by using a super-resolution frequency estimation method, to calculate distances based on the frequency analysis. Other components given the same reference numerals as those in FIG. 1 are similar to those of Embodiment 1, and their explanations are omitted.

Next, an operation of the radar system according to Embodiment 2 of the invention will be explained. Even in the radar system of Embodiment 2, the reference signals 20 are generated that have waveforms as shown in FIG. 2 by the reference signal generator 11, and further processed, therefrom up to the frequency-analysis unit 6, in a manner similar to those in Embodiment 1.

The velocity calculator 71, subsequent to that, detects frequency at which amplitude values peak in a manner similar to the distance/velocity calculator 7 of Embodiment 1 so as to calculate relative velocities of target objects based on Formula (5), and outputs them as the relative velocities 30. Moreover, peak frequency information used in the velocity calculation is outputted as the frequency analysis information 32. The frequency analysis information 32 is information that includes, for example, the frequency-analyzed results 29 (expressed by Formula (3)) outputted by the frequency analyzer 16 and frequency component numbers (k that locally maximize values of formula (4)) that give peak amplitude values of the frequency-analyzed results 29.

The distance calculator 72 is a section that also detects, in a manner similar to detecting a peak frequency throughout a plurality of frequency-modulation processes for one n-value in Formula (3), peak frequencies for the other n-values, to discriminate distances to a plurality of target objects at the same speed based on phase shifts (degrees of variation or variation rates) with respect to each peak frequency. This process, when the stepped frequencies are monotonically increased or decreased in the frequency-modulation processes, is equivalent to determining peak-frequency phase gradients with respect to n.

To be more specific, the distance calculator 72 extracts from the reception-signal storage means 15 reception signals 28 obtained by receiving the echoes 24 of the transmission waves 23 having been modulated into those of an identical stepped frequency in the plurality of frequency-modulation processes iterated by the transmission-signal frequency-modulation unit 2, to execute a frequency analysis using the super-resolution frequency estimation method. While, as such super-resolution frequency estimation method, it is possible to employ a MUSIC (multiple single classification) method, an ESPRIT (estimation of signal parameters via rotational invariance technique) method, an ML (maximum likelihood) method, the Capon method, a maximum entropy method, a linear prediction method, or a minimum norm method, an explanation is made here on an exemplar of a concrete process taking a MUSIC method as an example.

First, denoted by a frequency number $k_{peak}$ is one of the frequencies, determined by the velocity calculator 71, that gives peak amplitude values of Fourier-transformation outputs from the frequency analyzer 16. The distance calculator 72 combines the frequency component corresponding to the frequency number $k_{peak}$ with some other frequency components around the frequency component in the frequency-analysis results 29, to execute a frequency-averaging process.

In the following explanation, it is assumed, as an example, to use the frequency component corresponding to the frequency number $k_{peak}$ and the respective ones corresponding to prior and subsequent to the frequency number. That is, three frequency components corresponding to the frequency numbers $k_{peak}-1$, $k_{peak}$, and $k_{peak}+1$ are used.

If a plurality of target objects exists in the frequency component of the frequency number $k_{peak}$, in order to discriminate distances to the respective target objects, it is necessary to separate, from reception signals, frequencies for each stepped frequency in the frequency-modulation processes of the transmission-signal frequency-modulation unit 2. In order to make the frequencies separable for each different stepped frequency number n (n=1, ..., N) in the frequency-modulation processes, submatrixes $F_q$ composed of $N_s$ sampling data for different stepped frequency numbers n are defined first as Formula (7):

$$F_q = \text{submatrix}[F; n=q \ldots q+Ns, k=k_{peak}-1 \ldots k_{peak}+1] \in C^{Ns \times 3} q=1,\ldots, N-Ns \quad (7)$$

to execute a process of averaging the submatrixes $F_q$ to obtain correlation matrixes as Formula (8):

$$R = \langle F_q F_q^H \rangle \in C^{Ns \times Ns} \quad (8)$$

where H denotes complex transpose of matrix, and $\langle * \rangle$, averaging operation with respect to q.

Then, the distance calculator 72 executes an eigenfunction expansion of the correlation matrixes R obtained by frequency-averaging using Formula (8), to obtain a noise space $E=[e_1, \ldots, e_{Ns-L}]$ composed of eigenvectors $e_a$ (a=1, ..., Ns–L) corresponding to nose eigenvalues. Here, L is the number of signals, which is obtained, for example, from the number of eigenvalues that are larger than noise eigenvalues.

After this, the distance calculator 72 executes a frequency-estimation process to calculate each distance to the plurality of target objects. The frequency-estimation process is as follows: the distance calculator 72 calculates mode vectors that locally maximize values of an evaluation function MUSIC (R), which is expressed by mode vectors a(R) and the noise space E as Formula (9):

$$\text{MUSIC}(R) = \frac{a^H(R)a(R)}{a^H(R)EE^H a(R)}. \quad (9)$$

Here, the mode vectors a(R) are given by Formula (10):

$$a(R) \equiv \left[ \exp\left[ j \left\{ 2\pi \left( \left( \frac{2}{\lambda} v T_{PRI} - \frac{2R}{c} \Delta f \right) n \right) \right\} \right] \right] \in C^{Ns \times 1}. \quad (10)$$

Namely, a plurality of R is calculated at which the mode vectors a(R) (Formula (10)) locally maximize the evaluation function MUSIC(R) (formula (9)), to be outputted as the distances 31 to each of the plurality of target objects traveling at the same speed.

As has been described above, according to Embodiment 2 of the present invention, distances to a plurality of target objects at the same speed, which cannot be discriminated by conventional two-frequency CW methods, can be discriminated by using a super-resolution frequency estimation method.

INDUSTRIAL APPLICABILITY

The present invention is applicable to radar systems in general, more particularly is valuable for cost reduction of vehicle-mounted radar systems and for improvement of their performance.

The invention claimed is:

1. A target object detection system for emitting, toward a target object, transmission signals as transmission waves, whose frequencies have been modulated successively into a plurality of stepped frequencies, and for receiving echoes of the transmission waves reflected from the target object, thereby to calculate a relative velocity of the target object by frequency-analyzing reception signals obtained from the echoes, the target object detection system comprising:
   a frequency-modulation unit that successively executes, within a measurement time derived from a desired velocity resolution, a plurality of times iterated frequency-modulation processes, where each of the frequency-modulation processes successively modulates the transmission signals into the stepped frequencies; and
   a frequency-analysis unit that frequency-analyzes, within said measurement time, for each of the stepped frequencies, throughout the plurality of frequency-modulation processes those signals, among the reception signals, corresponding to the identical stepped frequency in the frequency-modulation processes,
   wherein said measurement time is a minimum frequency modulation period required for the desired velocity resolution.

2. The target object detection system as recited in claim 1, wherein
   the frequency-analysis unit, by executing the frequency-analyzing throughout the plurality of frequency-modulation processes, generates a first frequency-analysis-result signal from reception signals corresponding to a first stepped frequency in the frequency-modulation processes, and, by executing the frequency-analyzing throughout the plurality of frequency-modulation processes, generates a second frequency-analysis-result signal from reception signals corresponding to a second stepped frequency different from the first stepped frequency, the target object detection system further comprising
   a distance-calculation unit that detects frequency components as a first peak frequency and a second peak frequency at which respective amplitude values of the first and the second frequency-analysis-result signals peak, and calculates a distance to the target object from the difference in signal phase between the detected first and second peak frequencies.

3. The target object detection system as recited in claim 1, wherein
   the frequency-analysis unit, by frequency-analyzing, throughout the plurality of frequency-modulation processes, reception signals corresponding to each of those stepped frequencies chosen from the plurality of stepped frequencies of the transmission signals modulated by the frequency-modulation unit, generates frequency-analysis-result signals from the reception signals, the target object detection system further comprising:
a velocity-calculation unit that detects frequency components that give peak amplitude values of the frequency-analysis-result signals obtained from the reception signals corresponding to those stepped frequencies, and calculates from the frequency components a relative velocity of the target object; and
a distance-calculation unit that calculates phase component shifts with respect to those stepped frequencies by frequency-analyzing throughout the plurality of stepped frequencies the frequency components detected by the velocity-calculation unit, and calculates a distance to the target object based on the phase component shifts.

4. The target object detection system as recited in claim 3, wherein
the distance-calculation unit, by frequency-analyzing throughout the plurality of frequency-modulation processes with a super-resolution method, the frequency components detected by the velocity-calculation unit, calculates phase component shifts with respect to those stepped frequencies chosen from the plurality of stepped frequencies.

5. A target object detection method of emitting, toward a target object, transmission signals as transmission waves, whose frequencies have been modulated successively into a plurality of stepped frequencies, and of receiving echoes of the transmission waves reflected from the target object, thereby to calculate a relative velocity of the target object by frequency-analyzing reception signals obtained from the echoes, the target object detection method comprising:
successively executing, within a measurement time derived from a desired velocity resolution, a plurality of times iterated frequency-modulation processes, each of the frequency-modulation processes successively modulating the transmission signals into the stepped frequencies; and
frequency-analyzing, within said measurement time, for each of the stepped frequencies, throughout the plurality of frequency-modulation processes, those signals, among the reception signals, corresponding to the identical stepped frequency in the frequency-modulation processes,
wherein said measurement time is a minimum frequency modulation period required for the desired velocity resolution.

6. The target object detection method as recited in claim 5, wherein
executing the frequency-analyzing throughout the plurality of frequency-modulation processes includes generating a first frequency-analysis-result signal from reception signals corresponding to a first stepped frequency in the frequency-modulation processes;
executing the frequency-analyzing throughout the plurality of frequency-modulation processes includes generating a second frequency-analysis-result signal from reception signals corresponding to a second stepped frequency different from the first stepped frequency; and
wherein the method further comprises:
detecting frequency components as a first peak frequency and a second peak frequency at which respective amplitude values of the first and the second frequency-analysis-result signals peak, and
calculating a distance to the target object from the difference in signal phase between the detected first and second peak frequencies.

7. The target object detection system as recited in claim 5, wherein
frequency-analyzing, throughout the plurality of frequency-modulation processes, reception signals corresponding to each of those stepped frequencies chosen from the plurality of stepped frequencies of the transmission signals modulated by the frequency-modulation processes includes generating frequency-analysis-result signals from the reception signals; and
wherein the method further comprises:
detecting frequency components that give peak amplitude values of the frequency-analysis-result signals obtained from the reception signals corresponding to those stepped frequencies, and calculating from the frequency components a relative velocity of the target object; and
calculating phase component shifts with respect to those stepped frequencies by frequency-analyzing throughout the plurality of stepped frequencies the frequency components detected in said detecting frequency components step, and calculating a distance to the target object based on the phase component shifts.

8. The target object detection method as recited in claim 7, wherein calculating phase component shifts includes:
frequency-analyzing, throughout the plurality of frequency-modulation processes, with a super-resolution method, the frequency components detected said detecting frequency components step; and
calculating phase component shifts with respect to those stepped frequencies chosen from the plurality of stepped frequencies.

9. A target object detection device for emitting, toward a target object, transmission signals as transmission waves, whose frequencies have been modulated successively into a plurality of stepped frequencies, and for receiving echoes of the transmission waves reflected from the target object, thereby to calculate a relative velocity of the target object by frequency-analyzing reception signals obtained from the echoes, the target object detection device comprising:
a frequency-modulation unit that successively executes, within a measurement time derived from a desired velocity resolution, a plurality of times, iterated frequency-modulation processes, where each iterated frequency-modulation process successively modulates the transmission signals into the stepped frequencies; and
a frequency-analysis unit that frequency-analyzes, within said measurement time, for each of the stepped frequencies, throughout the plurality of frequency-modulation processes those signals, among the reception signals, corresponding to the identical stepped frequency in the frequency-modulation processes,
wherein said measurement time is a minimum frequency modulation period required for the desired velocity resolution.

10. The target object detection device as recited in claim 9, wherein
the frequency-analysis unit, by executing the frequency-analyzing throughout the plurality of frequency-modulation processes, generates a first frequency-analysis-result signal from reception signals corresponding to a first stepped frequency in the frequency-modulation processes, and, by executing the frequency-analyzing throughout the plurality of frequency-modulation processes, generates a second frequency-analysis-result signal from reception signals corresponding to a second stepped frequency different from the first stepped frequency, the target object detection system further comprising a distance-calculation unit that detects frequency components as a first peak frequency and a second peak frequency at which respective amplitude values of the first and the second frequency-analysis-result signals peak, and calculates a distance to the target object from the difference in signal phase between the detected first and second peak frequencies.

11. The target object detection device as recited in claim 9, wherein the frequency-analysis unit, by frequency-analyzing, throughout the plurality of frequency-modulation processes, reception signals corresponding to each of those stepped frequencies chosen from the plurality of stepped frequencies of the transmission signals modulated by the frequency-modulation unit, generates frequency-analysis-result signals from the reception signals, the target object detection system further comprising:

a velocity-calculation unit that detects frequency components that give peak amplitude values of the frequency-analysis-result signals obtained from the reception signals corresponding to those stepped frequencies, and calculates from the frequency components a relative velocity of the target object; and a distance-calculation unit that calculates phase component shifts with respect to those stepped frequencies by frequency-analyzing throughout the plurality of stepped frequencies the frequency components detected by the velocity-calculation unit, and calculates a distance to the target object based on the phase component shifts.

12. The target object detection device as recited in claim 11, wherein the distance-calculation unit, by frequency-analyzing throughout the plurality of frequency-modulation processes with a super-resolution method, the frequency components detected by the velocity-calculation unit, calculates phase component shifts with respect to those stepped frequencies chosen from the plurality of stepped frequencies.

\* \* \* \* \*